(12) United States Patent
Bernbo et al.

(10) Patent No.: US 9,626,378 B2
(45) Date of Patent: Apr. 18, 2017

(54) METHOD FOR HANDLING REQUESTS IN A STORAGE SYSTEM AND A STORAGE NODE FOR A STORAGE SYSTEM

(75) Inventors: Stefan Bernbo, Karlskrona (SE); Christian Melander, Rodeby (SE); Roger Persson, Karlskrona (SE); Gustav Petersson, Sturko (SE)

(73) Assignee: COMPUVERDE AB (SE)

(*) Notice: Subject to any disclaimer, the term of this patent is extended or adjusted under 35 U.S.C. 154(b) by 692 days.

(21) Appl. No.: 13/224,424

(22) Filed: Sep. 2, 2011

(65) Prior Publication Data
US 2013/0058333 A1    Mar. 7, 2013

(51) Int. Cl.
*G06F 17/30* (2006.01)

(52) U.S. Cl.
CPC .............................. *G06F 17/30206* (2013.01)

(58) Field of Classification Search
None
See application file for complete search history.

(56) References Cited

U.S. PATENT DOCUMENTS

| | | | |
|---|---|---|---|
| 3,707,707 A | 12/1972 | Spencer et al. | |
| 5,787,247 A | 7/1998 | Norin et al. | |
| 6,003,065 A | 12/1999 | Yan et al. | |
| 6,021,118 A | 2/2000 | Houck et al. | |
| 6,055,543 A | 4/2000 | Christensen et al. | |
| 6,345,308 B1 | 2/2002 | Abe | |
| 6,389,432 B1 | 5/2002 | Pothapragada et al. | |
| 6,470,420 B1 | 10/2002 | Hospodor | |
| 6,782,389 B1 | 8/2004 | Chrin et al. | |
| 6,839,815 B2 | 1/2005 | Kagami et al. | |
| 6,925,737 B2 | 8/2005 | Bolduan et al. | |
| 6,985,956 B2 | 1/2006 | Luke et al. | |
| 7,039,661 B1 | 5/2006 | Ranade | |

(Continued)

FOREIGN PATENT DOCUMENTS

| | | |
|---|---|---|
| CN | 1726454 A | 1/2006 |
| EP | 774723 A3 | 7/1998 |

(Continued)

OTHER PUBLICATIONS

U.S. Appl. No. 13/170,672, filed Jun. 28, 2011, Bernbo et al.

(Continued)

*Primary Examiner* — Alexey Shmatov
*Assistant Examiner* — Matthew Ellis
(74) *Attorney, Agent, or Firm* — Condo Roccia Koptiw LLP

(57) ABSTRACT

According to an embodiment there is provided a method for handling requests in a storage system including a plurality of storage nodes connected to each other via a communications network. A first storage node of the plurality of storage nodes may store a reference to a set of at least one collection object stored in the storage system. Each collection object of the set may include at least one of a reference to another collection object stored in the storage system and a reference to at least one data file stored in the storage system. The method may include receiving a first request at the first storage node. The first storage node, for each collection object of the set, may send a second request to a storage node storing the collection object. According to a second aspect there is also provided a storage node.

19 Claims, 5 Drawing Sheets

(56) References Cited

U.S. PATENT DOCUMENTS

| | | |
|---|---|---|
| 7,200,664 B2 | 4/2007 | Hayden |
| 7,206,836 B2 | 4/2007 | Dinker et al. |
| 7,266,556 B1 | 9/2007 | Coates |
| 7,320,088 B1 | 1/2008 | Gawali |
| 7,340,510 B1 | 3/2008 | Liskov et al. |
| 7,352,765 B2 | 4/2008 | Dai et al. |
| 7,406,484 B1 | 7/2008 | Srinivasan et al. |
| 7,487,305 B2 | 2/2009 | Hill et al. |
| 7,503,052 B2 | 3/2009 | Castro et al. |
| 7,546,486 B2 | 6/2009 | Slik et al. |
| 7,568,069 B2 | 7/2009 | Jantz et al. |
| 7,574,488 B2 | 8/2009 | Matsubara |
| 7,590,672 B2 | 9/2009 | Slik et al. |
| 7,593,966 B2 | 9/2009 | Therrien et al. |
| 7,624,155 B1 | 11/2009 | Nordin et al. |
| 7,624,158 B2 | 11/2009 | Slik et al. |
| 7,631,023 B1 | 12/2009 | Kaiser et al. |
| 7,631,045 B2 | 12/2009 | Boerries et al. |
| 7,631,313 B2 | 12/2009 | Mayhew et al. |
| 7,634,453 B1 | 12/2009 | Bakke et al. |
| 7,647,329 B1 | 1/2010 | Fischman et al. |
| 7,694,086 B1 | 4/2010 | Bezbaruah et al. |
| 7,769,711 B2 | 8/2010 | Srinivasan et al. |
| 7,778,972 B1 | 8/2010 | Cormie et al. |
| 7,822,766 B2 | 10/2010 | Arndt et al. |
| 7,840,992 B1 | 11/2010 | Dufrene et al. |
| 7,873,650 B1* | 1/2011 | Chapman et al. ............ 707/764 |
| 7,885,982 B2 | 2/2011 | Wight et al. |
| 8,060,598 B1 | 11/2011 | Cook et al. |
| 8,073,881 B1* | 12/2011 | Georgiev ...................... 707/812 |
| 8,190,561 B1 | 5/2012 | Poole et al. |
| 8,255,430 B2 | 8/2012 | Dutton et al. |
| 8,296,398 B2 | 10/2012 | Lacapra et al. |
| 8,401,997 B1 | 3/2013 | Tawri et al. |
| 8,417,828 B2 | 4/2013 | Ma et al. |
| 8,443,062 B2 | 5/2013 | Voutilainen et al. |
| 8,468,214 B1 | 6/2013 | Bourlas et al. |
| 8,561,115 B2 | 10/2013 | Hattori et al. |
| 8,577,957 B2 | 11/2013 | Behar et al. |
| 8,707,091 B2 | 4/2014 | Gladwin et al. |
| 9,098,683 B2 | 8/2015 | Rose |
| 9,225,780 B2 | 12/2015 | Braam et al. |
| 9,367,448 B1 | 6/2016 | Botelho et al. |
| 2001/0034812 A1 | 10/2001 | Ignatius et al. |
| 2001/0047400 A1* | 11/2001 | Coates et al. ................. 709/219 |
| 2002/0042693 A1 | 4/2002 | Kampe et al. |
| 2002/0073086 A1* | 6/2002 | Thompson ............ H04L 41/04 |
| 2002/0103888 A1 | 8/2002 | Janz et al. |
| 2002/0114341 A1 | 8/2002 | Sutherland et al. |
| 2002/0145786 A1 | 10/2002 | Chang et al. |
| 2002/0156912 A1 | 10/2002 | Hurst et al. |
| 2003/0026254 A1 | 2/2003 | Sim |
| 2003/0097468 A1 | 5/2003 | Hamadi |
| 2003/0120654 A1 | 6/2003 | Edlund et al. |
| 2003/0126122 A1 | 7/2003 | Bosley et al. |
| 2003/0154238 A1 | 8/2003 | Murphy et al. |
| 2003/0172089 A1 | 9/2003 | Douceur et al. |
| 2003/0177261 A1 | 9/2003 | Sekiguchi et al. |
| 2003/0233455 A1 | 12/2003 | Leber et al. |
| 2004/0010654 A1 | 1/2004 | Yasuda et al. |
| 2004/0059805 A1 | 3/2004 | Dinker et al. |
| 2004/0064729 A1 | 4/2004 | Yellepeddy |
| 2004/0078466 A1 | 4/2004 | Coates et al. |
| 2004/0088297 A1 | 5/2004 | Coates et al. |
| 2004/0111730 A1 | 6/2004 | Apte |
| 2004/0243675 A1 | 12/2004 | Taoyama et al. |
| 2004/0260775 A1 | 12/2004 | Fedele |
| 2005/0010618 A1 | 1/2005 | Hayden |
| 2005/0015431 A1 | 1/2005 | Cherkasova |
| 2005/0015461 A1 | 1/2005 | Richard et al. |
| 2005/0038990 A1 | 2/2005 | Sasakura et al. |
| 2005/0044092 A1 | 2/2005 | Adya et al. |
| 2005/0055418 A1 | 3/2005 | Blanc et al. |
| 2005/0177550 A1 | 8/2005 | Jacobs et al. |
| 2005/0193245 A1 | 9/2005 | Hayden et al. |
| 2005/0204042 A1 | 9/2005 | Banerjee et al. |
| 2005/0246393 A1 | 11/2005 | Coates et al. |
| 2005/0256894 A1 | 11/2005 | Talanis et al. |
| 2005/0278552 A1 | 12/2005 | Delisle et al. |
| 2005/0283649 A1 | 12/2005 | Turner et al. |
| 2006/0031230 A1* | 2/2006 | Kumar ............................ 707/10 |
| 2006/0031439 A1 | 2/2006 | Saffre |
| 2006/0047776 A1 | 3/2006 | Chieng et al. |
| 2006/0080574 A1 | 4/2006 | Saito et al. |
| 2006/0090045 A1 | 4/2006 | Bartlett et al. |
| 2006/0090095 A1 | 4/2006 | Massa et al. |
| 2006/0112154 A1 | 5/2006 | Douceur et al. |
| 2006/0218203 A1 | 9/2006 | Yamato et al. |
| 2007/0022087 A1 | 1/2007 | Bahar et al. |
| 2007/0022121 A1 | 1/2007 | Bahar et al. |
| 2007/0022122 A1 | 1/2007 | Bahar et al. |
| 2007/0022129 A1 | 1/2007 | Bahar et al. |
| 2007/0055703 A1 | 3/2007 | Zimran et al. |
| 2007/0088703 A1 | 4/2007 | Kasiolas et al. |
| 2007/0094269 A1* | 4/2007 | Mikesell ............ G06F 11/1435 |
| 2007/0094354 A1 | 4/2007 | Soltis |
| 2007/0189153 A1 | 8/2007 | Mason |
| 2007/0198467 A1 | 8/2007 | Wiser et al. |
| 2007/0220320 A1 | 9/2007 | Sen et al. |
| 2007/0276838 A1 | 11/2007 | Abushanab et al. |
| 2007/0288494 A1 | 12/2007 | Chrin et al. |
| 2007/0288533 A1 | 12/2007 | Srivastava et al. |
| 2007/0288638 A1 | 12/2007 | Vuong et al. |
| 2008/0005199 A1 | 1/2008 | Chen et al. |
| 2008/0043634 A1 | 2/2008 | Wang et al. |
| 2008/0077635 A1 | 3/2008 | Sporny et al. |
| 2008/0084889 A1* | 4/2008 | Archer .................... H04L 45/00 370/400 |
| 2008/0104218 A1 | 5/2008 | Liang et al. |
| 2008/0104666 A1 | 5/2008 | Dillaway |
| 2008/0109830 A1 | 5/2008 | Giotzbach et al. |
| 2008/0126357 A1 | 5/2008 | Casanova et al. |
| 2008/0168157 A1 | 7/2008 | Marchand |
| 2008/0171556 A1 | 7/2008 | Carter |
| 2008/0172478 A1 | 7/2008 | Kiyohara et al. |
| 2008/0198752 A1 | 8/2008 | Fan et al. |
| 2008/0216174 A1 | 9/2008 | Vogel et al. |
| 2008/0235321 A1 | 9/2008 | Matsuo |
| 2008/0244674 A1 | 10/2008 | Hayashi |
| 2008/0270822 A1 | 10/2008 | Fan et al. |
| 2009/0043922 A1 | 2/2009 | Crowther |
| 2009/0083810 A1 | 3/2009 | Hattori et al. |
| 2009/0132543 A1 | 5/2009 | Chatley et al. |
| 2009/0172211 A1 | 7/2009 | Perry et al. |
| 2009/0172307 A1 | 7/2009 | Perry et al. |
| 2009/0228669 A1 | 9/2009 | Slesarev et al. |
| 2009/0249222 A1 | 10/2009 | Schmidt et al. |
| 2009/0271412 A1 | 10/2009 | Lacapra et al. |
| 2009/0287842 A1 | 11/2009 | Plamondon |
| 2010/0115078 A1 | 5/2010 | Ishikawa et al. |
| 2010/0161138 A1 | 6/2010 | Lange et al. |
| 2010/0169391 A1 | 7/2010 | Baptist et al. |
| 2010/0169415 A1 | 7/2010 | Leggette et al. |
| 2010/0185693 A1 | 7/2010 | Murty et al. |
| 2010/0198888 A1 | 8/2010 | Blomstedt et al. |
| 2010/0198889 A1 | 8/2010 | Byers et al. |
| 2010/0223262 A1* | 9/2010 | Krylov et al. ................. 707/728 |
| 2010/0303071 A1 | 12/2010 | Kotalwar et al. |
| 2011/0047413 A1 | 2/2011 | McGill et al. |
| 2011/0047620 A1 | 2/2011 | Mahaffey et al. |
| 2011/0055353 A1 | 3/2011 | Tucker et al. |
| 2011/0072206 A1 | 3/2011 | Ross et al. |
| 2011/0087690 A1 | 4/2011 | Cairns |
| 2011/0125814 A1 | 5/2011 | Slik et al. |
| 2011/0238909 A1 | 9/2011 | Kumar et al. |
| 2011/0252204 A1 | 10/2011 | Coon et al. |
| 2012/0066498 A1 | 3/2012 | Engert |
| 2012/0180070 A1 | 7/2012 | Pafumi et al. |
| 2012/0191771 A1 | 7/2012 | Preston et al. |
| 2012/0290870 A1 | 11/2012 | Shah et al. |
| 2012/0331021 A1 | 12/2012 | Lord |
| 2013/0060884 A1 | 3/2013 | Bernbo et al. |
| 2013/0103851 A1 | 4/2013 | Umeki et al. |
| 2013/0133030 A1 | 5/2013 | Xue et al. |

(56) References Cited

U.S. PATENT DOCUMENTS

| | | |
|---|---|---|
| 2013/0254314 A1 | 9/2013 | Chow et al. |
| 2013/0268632 A1 | 10/2013 | Baron et al. |
| 2014/0006796 A1 | 1/2014 | Smith et al. |
| 2014/0298135 A1 | 10/2014 | Dhuse et al. |
| 2015/0288659 A1 | 10/2015 | Lukacs |
| 2016/0099963 A1 | 4/2016 | Mahaffey et al. |

FOREIGN PATENT DOCUMENTS

| | | | |
|---|---|---|---|
| EP | 934568 B1 | 6/2003 | |
| EP | 1521189 A2 | 4/2005 | |
| EP | 1578088 A2 | 9/2005 | |
| EP | 1669850 A1 | 6/2006 | |
| EP | 1798934 A1 | 6/2007 | |
| EP | 2031513 A2 | 3/2009 | |
| JP | 06348527 A | 12/1994 | |
| JP | 11249874 A | 9/1999 | |
| JP | 2000-3222292 A | 11/2000 | |
| JP | 2003030012 A | 1/2003 | |
| JP | 2003223286 A | 8/2003 | |
| JP | 2003248607 A | 9/2003 | |
| JP | 2003271316 A | 9/2003 | |
| JP | 2004-005491 A | 1/2004 | |
| JP | 2007058275 A | 3/2007 | |
| JP | 2008250767 A | 10/2008 | |
| JP | 2009-259007 A | 11/2009 | |
| WO | WO 99/38093 A1 | 7/1999 | |
| WO | WO-0118633 A1 | 3/2001 | |
| WO | WO-0235359 A2 | 5/2002 | |
| WO | WO 02/44835 A2 | 6/2002 | |
| WO | WO-2004053677 A2 | 6/2004 | |
| WO | WO 2006/124911 A2 | 11/2006 | |
| WO | WO 2007/014296 A2 | 2/2007 | |
| WO | WO 2007/115317 A2 | 10/2007 | |
| WO | WO-2007134918 A1 | 11/2007 | |
| WO | WO-2008069811 A1 | 6/2008 | |
| WO | WO-2008102195 A1 | 8/2008 | |
| WO | WO 2009/048726 A1 | 4/2009 | |
| WO | WO 2010/046393 A2 | 4/2010 | |
| WO | WO 2010046393 A2 * | 4/2010 | .......... G06F 11/1662 |
| WO | WO 2010/080533 A2 | 7/2010 | |
| WO | WO 2011/131717 A1 | 10/2011 | |

OTHER PUBLICATIONS

U.S. Appl. No. 13/170,735, filed Jun. 28, 2011, Bernbo et al.
International Patent Application No. PCT/EP2009/63796: Written Opinion, Jan. 18, 2010, 6 pages.
International Patent Application No. PCT/EP2009/63796: International Preliminary Report on Patentability, Jan. 12, 2011, 5 pages.
International Patent Application No. PCT/EP2011/056317: International Search Report, Aug. 9, 2011, 4 pages.
Tang et al., "An Efficient Data Location Protocol for Self-organizing Storage Clusters", Supercomputing, ACM/IEEE Conference, Phoenix, AZ, USA, Nov. 15-21, 2003, 1-13.
Weatherspoon et al., "Antiquity: Exploiting a Secure Log for Wide-Area Distributed Storage", Proceedings of the 2007 EuroSys Conference, ACM 2007, Lisbon, Portugal, Mar. 21-23, 2007, 371-384.
Anonymous: "Squid configuration directive reply_body_max_size", Dec. 21, 2008, pp. 1-2. XP55042055, Retrieved from the Internet: URL:http://web.archive.org/web/20081221142145/http://www.squid-cache.org/Doc/config/reply_body_max_size/ [retrieved on Oct. 24, 2012], p. 1.
Anonymous: "FAQ: How do I block large files by Content Size before download?", Mar. 23, 2009, pp. 1-2, XP55042048, Retrieved from the Internet: URL:http://www.trustwave.com/support/kb/article.aspx?id=13166, [retrieved on Oct. 24, 2012], p. 1.
Anonymous: "Queues for Prioritized Message Processing", Feb. 6, 2009, p. 1, XP55042195, Retrieved from the Internet: URL:http://web.archive.org/web/20090206110207/http://help.sap.com/saphelp_nw04/helpdata/en/04/827440c36ed562e10000000a155106/content.htm, [retrieved on Oct. 25, 2012], p. 1.
Chi Zhang et al: "Brushwood: Distributed Trees in Peer-to-Peer Systems", 2005, Peer-To-Peer Systems IV Lecture Notes in Computer Science;;LNCS, Springer, Berlin, DE, pp. 47-57, XP019019955, ISBN: 978-3-540-29068-1, sections 1-3.
Anonymous: "FastTrack", Jan. 8, 2011, pp. 1-3, XP55041807, Retrieved from the Internet: URL:http://de.wikipedia.org/w/index.php?title=FastTrack&oldid=83614953 [retrieved on Oct. 22, 2012], pp. 1-2.
Anonymous: "Load balancing (computing)", Aug. 25, 2011, pp. 1-6, XP55041742, Retrieved from the Internet: URL:http://en.wikipedia.org/w/index.php?title=Load_balancing_%28computing%29&oldid=446655159 [retrieved on Oct. 22, 2012], pp. 1-5.
U.S. Appl. No. 13/224,393, filed Sep. 2, 2011, Bernbo et al.
U.S. Appl. No. 13/224,404, filed Sep. 2, 2011, Bernbo et al.
U.S. Appl. No. 13/224,415, filed Sep. 2, 2011, Bernbo et al.
U.S. Appl. No. 13/224,433, filed Sep. 2, 2011, Bernbo et al.
U.S. Appl. No. 13/224,446, filed Sep. 2, 2011, Bernbo et al.
U.S. Appl. No. 13/125,524, filed Apr. 21, 2011, Bernbo et al.
U.S. Appl. No. 13/171.350, filed Jun. 30, 2011, Bernbo et al.
Deering et al., "Multicast Routing in Datagram Internetworks and Extended LANs", ACM Transactions on Computer Systems, vol. 8, No. 2, May 1990, pp. 85-110.
Suryanarayanan et al., "Performance Evaluation of New Methods of Automatic Redirection for Load Balancing of Apache Servers Distributed in the Internet", Proceedings. 25th Annual IEEE Conference on Local Computer Networks, Nov. 8-10, 2000, pp. 644-651.
Nancy P. Kronenberg et al., "VAXclusters: A Closely-Coupled Distributed System, ACM Transactions on Computer Systems", vol. 4, No. 2, May 1986, pp. 130-146.
HP Volume Shadowing for OpenVMS , "Introduction to Volume Shadowing for OpenVMS", OpenVMS Alpha 7.3-2, Sep. 2003.
Keith Parris, "Using OpenVMS Clusters for Diaster Tolerance", HP Services—Systems Engineering.
Wataru Katsurashima et al., "NAS Switch: A novel CIFS server virtualization", IEEE, 2003.

* cited by examiner

METHOD FOR HANDLING REQUESTS IN A STORAGE SYSTEM AND A STORAGE NODE FOR A STORAGE SYSTEM

CROSS-REFERENCE TO RELATED APPLICATIONS

This application includes subject matter that may be related to subject matter included in the following applications: U.S. patent application Ser. No. 13/224,393 entitled "A Method And Device For Maintaining Data In A Data Storage System Comprising A Plurality Of Data Storage Nodes," filed Sep. 2, 2011; U.S. patent application Ser. No. 13/224,404 entitled "Method And Device For Writing Data To A Data Storage System Comprising A Plurality Of Data Storage Nodes," filed Sep. 2, 2011; U.S. patent application Ser. No. 13/224,415 entitled "Method For Data Maintenance," filed Sep. 2, 2011; U.S. patent application Ser. No. 13/224,433 entitled "Method For Data Retrieval From A Distributed Data Storage System," filed Sep. 2, 2011; and U.S. patent application Ser. No. 13/224,446 entitled "Method For Updating Data In A Distributed Data Storage System," filed Sep. 2, 2011.

TECHNICAL FIELD

The present inventive concept relates to a method for handling requests in a storage system and a storage node for a storage system.

BACKGROUND

Both companies and personal users rely increasingly on off-site storage systems for storing important data such as databases, media files, digital photos, document files, backups etc. Such storage systems may include a plurality of storage nodes connected to each other via a communication network, such as a Local Area Network, a Wide Area Network or the Internet, and the data may be distributed between the storage nodes. In a variety of applications there exists a need to process requests in the storage system relating to stored data, e.g. a request for information regarding stored data, a request to perform file operations on stored data etc. There is thus a need for methods of handling requests in the storage system.

SUMMARY OF THE INVENTION

A method and a storage node for efficiently handling requests in a storage system comprising a plurality of storage nodes are disclosed.

For example, a method for handling requests in a storage system is disclosed. The storage system may include a plurality of storage nodes connected to each other via a communications network. A first storage node of said plurality of storage nodes may store a reference to a set of at least one collection object stored in the storage system. Each collection object of the set may include at least one of a reference to another collection object stored in the storage system. Each collection object may also include a reference to at least one data file, other than a collection object, stored in the storage system. The method for handling the request may include receiving a first request at the first storage node. The first storage node, for each collection object of said set, may send a second request to a storage node storing said collection object of said set.

A first request may be received by the first storage node which in turn may handle the first request and send a further second request to any number of further storage nodes which may store data relevant for the request. The processing resulting from the first request may be distributed to the relevant storage nodes in a recursive manner. The workload and processing performed by the originator of the first request and the first storage node may thereby be advantageously reduced.

For example, by utilizing the collection objects the data may be organized in a hierarchical structure or a directory tree wherein a collection object referred to by the first storage node may represent a subdirectory or subfolder in relation to the directory or folder represented by the first storage node. The first storage node may for example represent the root of the directory tree and include references to the subdirectories of the root directory.

Requests may be handled even in storage systems where no centralized register of the stored data and the storage structure is maintained.

For each collection object of the set, the second request may be sent in response to receiving the first request at the first storage node.

According to one embodiment the method further includes the first storage node transmitting a multicast message requesting that storage nodes storing a collection object of said set to respond. The first storage node may receive a response from another storage node that received the multicast message. The first storage node may send a second request to the responding storage node. The first storage node may thus determine which other storage nodes to send the second request to even if the first storage node, when receiving the first request, was unaware of other storage node ins the storage system stored the referenced collection object. For the purpose of handling requests, each storage node may discover storage nodes that store a referenced collection object.

According to one embodiment the first storage node may store, for a collection object of said set, an indication which indicates the identity of another storage node that stores said collection object. The method of handling requests may also include the first storage node sending the second request to a storage node based on the indication. The storage node may thus, without any additional preceding communications, send the second request to a correct storage node. This embodiment may be combined with the preceding embodiment wherein the first storage node may perform the method of the preceding embodiment for a first collection object, for which the first storage node has no a prior knowledge of a storage location, and use the indication for a second collection object for which the first storage node stores an indication of a storage location.

According to one embodiment a collection object of said set is stored at least two storage nodes of the storage system, the method further comprising: the first storage node sending the second request to one of said at least two storage nodes. A collection object may thus be stored in a redundant manner in the storage system wherein the data security may be improved. Moreover, the first storage node may send the second request to only one of the at least two storage nodes. This may be advantageous in that redundant and identical responses to the second request from the second and third storage node may be avoided.

In another example, the method further includes the first storage node transmitting a multicast message requesting storage nodes storing the redundantly stored collection object to respond. The first storage node may receive a response from at least two storage nodes. The first storage node may send the second request to one of said at least two storage nodes. The first storage node may determine which further storage nodes to send the second request to even if the first storage node, when receiving the first request, is unaware of at which storage nodes the redundantly stored collection object is stored. Moreover, sending requests to multiple storage nodes storing copies of the same data may be avoided. The number of instances of the second request may hence be reduced wherein, in turn, the load on the storage system and the communications network may be reduced.

In another example, the first storage node may store an indication of which at least two storage nodes store the redundantly stored collection object. The first storage node may send the second request to one of the at least two storage nodes using the indication. The first storage node may thus, without any additional preceding communications, send the second request to one of the at least two storage nodes.

According to one embodiment a collection object of said set is stored on a second storage node of the storage system. The collection object may include a reference to an additional set of at least one collection object stored in the storage system. The second storage node, for each collection object of the additional set, may send a third request to a storage node storing said collection object of the additional set. A third request may thus be sent by the second storage node to further storage nodes storing referenced collection objects. The third request may be sent in response to the second storage node receiving the second request. The request may thus be distributed in a recursive manner in the storage system to storage nodes storing collection objects representing different levels of the directory tree. The third request may be based on the second request. Each collection object of the additional set may include at least one of a reference to another collection object stored in the storage system and a reference to at least one data file, other than a collection object, stored in the storage system.

According to another example, the first storage node may process the first request. For example, the first storage node may determine a first result based on the processing. The first storage node may sending the first result to an originator of the first request. The originator of the first request may thus receive a result of the first request.

According to one embodiment the first storage node may store a reference to a set of at least one data file, other than a collection object, stored in the storage system. The processing of the first request at the storage node may include processing the data files referenced in the collection objects in accordance with the first request.

According to one embodiment, each storage node receiving the second request may process the second request and determine a second result based on the processing. The node may then send the second result, for example to the first storage node. A result may thus be determined also at storage nodes receiving the second request. For example, the storage node be considered to store collection objects representing lower levels of the directory tree. The processing of the second request may include processing data files referenced in the collection object at the storage node in accordance with the second request.

According to one embodiment the second result is sent to the first storage node. Thereby the first storage node may ascertain that the second request has been received by other storage nodes. Moreover the first storage node may take the second result into account when determining the first result to be sent to the originator of the query.

According to one embodiment the method further includes the first storage node, in response to receiving the second result from a recipient of the second request, determining the first result based on the processing of the first request and the second result. The first storage node may also send the first result to the originator of the first request. The first result may include a combination of the result of the processing of the first request and the second result. The combination may be an aggregate of the results. The combination may be a concatenation of the results. The combination may be a sum of the results.

According to one embodiment the second result is sent to an originator of the first request. The second result determined at a storage node may thus be sent directly to the originator of the first request. Therefore the party interested in the result of the first request, e.g., the originator of the first request, may receive the result. Storage nodes, for example the first storage node, may not handle results from each of the plurality of storage nodes.

According to one embodiment the first request indicates a request for information regarding data stored in the storage system. The first request may for example indicate a request for a number of one or more data files or collection objects of a certain type, including a certain attribute, name, content or time stamp. In another example, the first request may indicate a request for an operation to be performed on data stored in the storage system.

According to one embodiment the second request is based on the first request. The second request may thus pertain to a same or corresponding request as the first request albeit optionally adapted for the recipient of the second request. Analogously the third request may be based on the second request.

The second request may be identical to the first request. Additionally, the third request may be identical to the second request. This makes it possible to implement the method in a true recursive fashion wherein the amount of processing needed to be performed by each storage node may be reduced.

According to one embodiment the first request pertains to data referenced at the first storage node and the second request pertains to data referenced in a collection object stored at a storage node receiving the second request. Analogously the third request sent by the above-mentioned second storage node may pertain to data referenced in a collection object stored at a storage node receiving the third request.

According to an embodiment, there is provided a storage node for a storage system comprising a plurality of storage nodes connected to each other via a communications network. A tangible storage medium storing a first collection object including a reference to a second collection object stored on a second storage node of the storage system may be include in the storage system. A third collection object stored on a third storage node of the storage system may also be included. A receiver configured to receive a first request from a fourth storage node of the storage system, the first request pertaining to data referenced in the first collection object may be included. A transmitter configured to send a second request to the second storage node and a third request to the third storage node may be included. The second and third requests may be based on the first request.

The second aspect may generally present the same or corresponding advantages as the first aspect.

BRIEF DESCRIPTION OF THE DRAWINGS

In addition to the host list, each storage node further contains a node list including the IP addresses of all or some storage nodes in its set or group of storage nodes. The number of storage nodes in a group may vary from a few to hundreds of storage nodes. The node list may further have a version number.

BRIEF DESCRIPTION OF THE DRAWINGS

Figure 1:
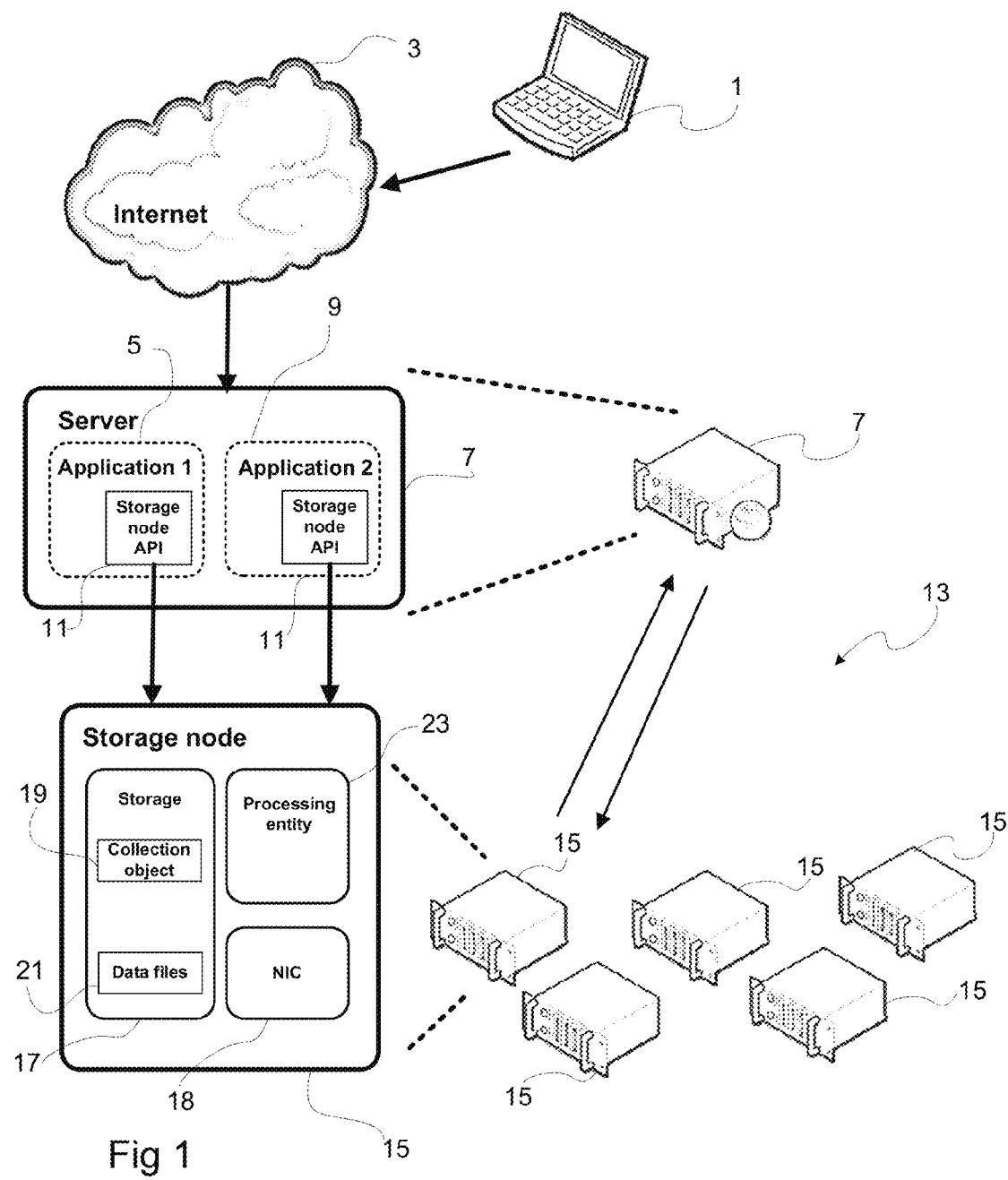

The above, as well as additional objects, features and advantages of the present inventive concept, will be better understood through the following illustrative and non-limiting detailed description of preferred embodiments of the present inventive concept, with reference to the appended drawings, where like reference numerals will be used for like elements, wherein:

FIG. 1 schematically illustrates an example distributed data storage system.

Figure 2:
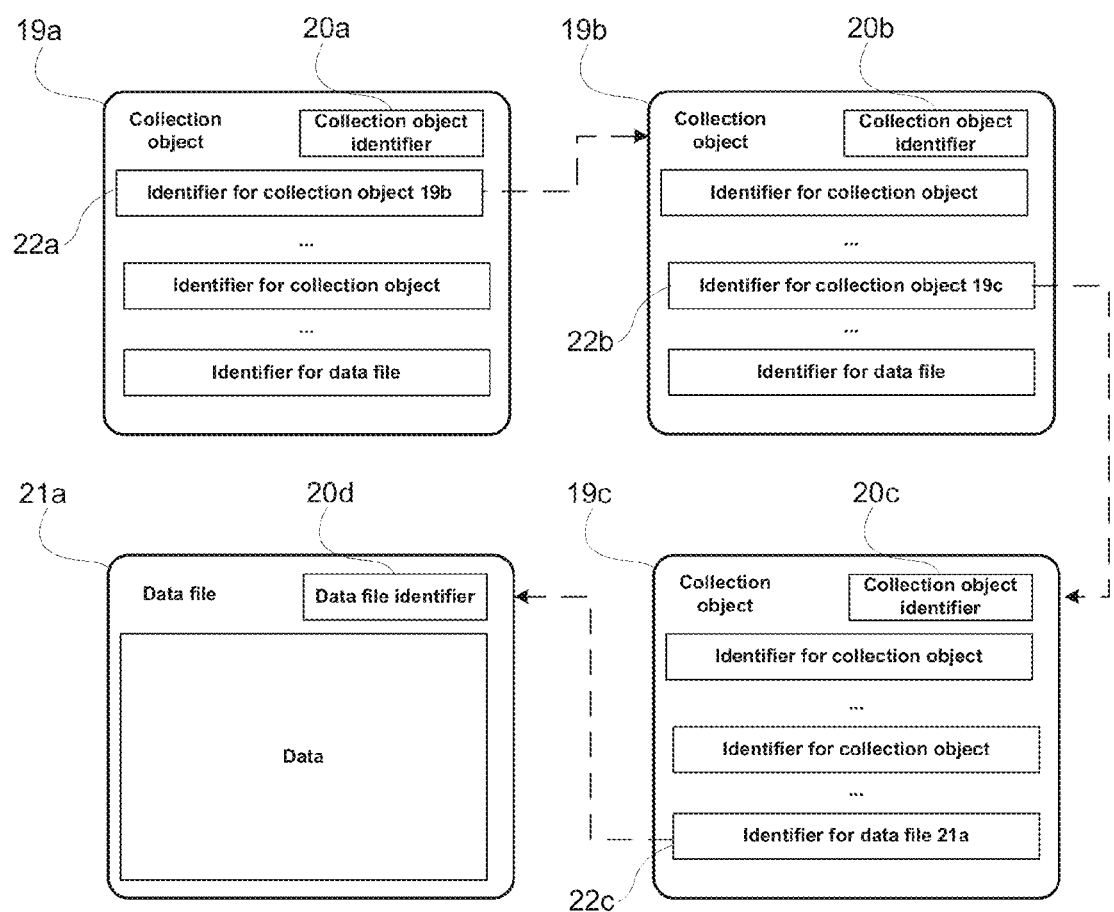

FIG. 2 schematically illustrates example collection objects and a data file.

Figure 3:
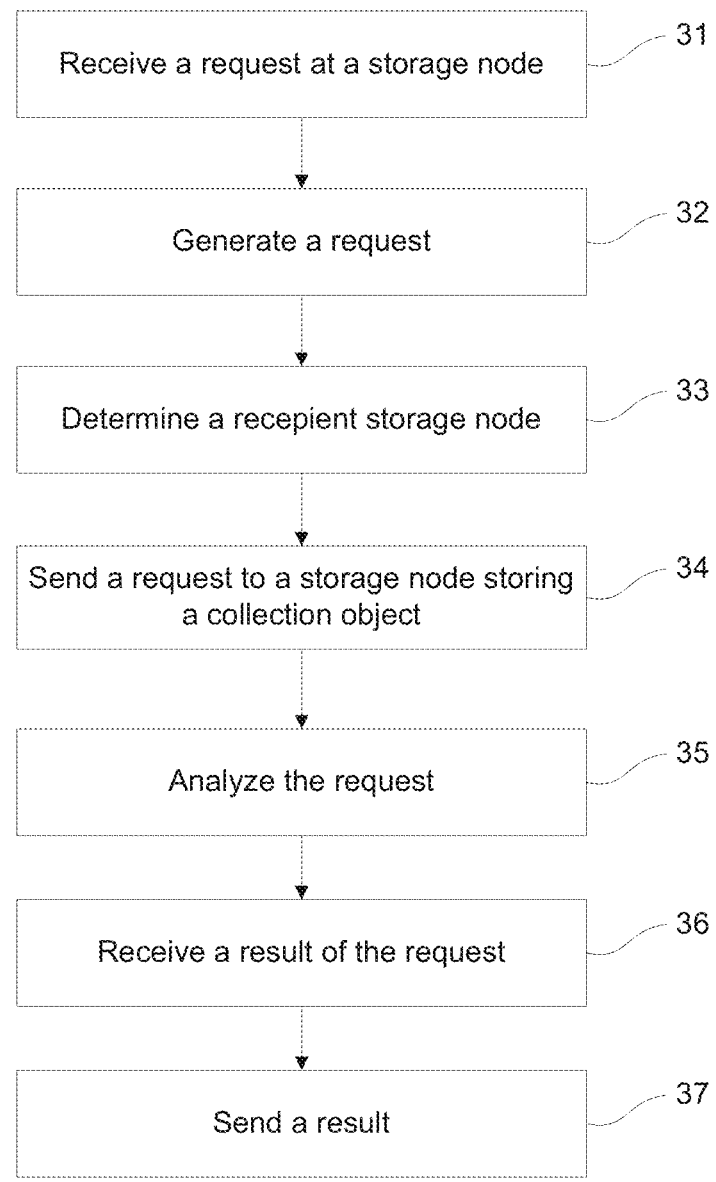

FIG. 3 is an example flow chart of a method for handling requests in the data storage system.

Figure 4A:
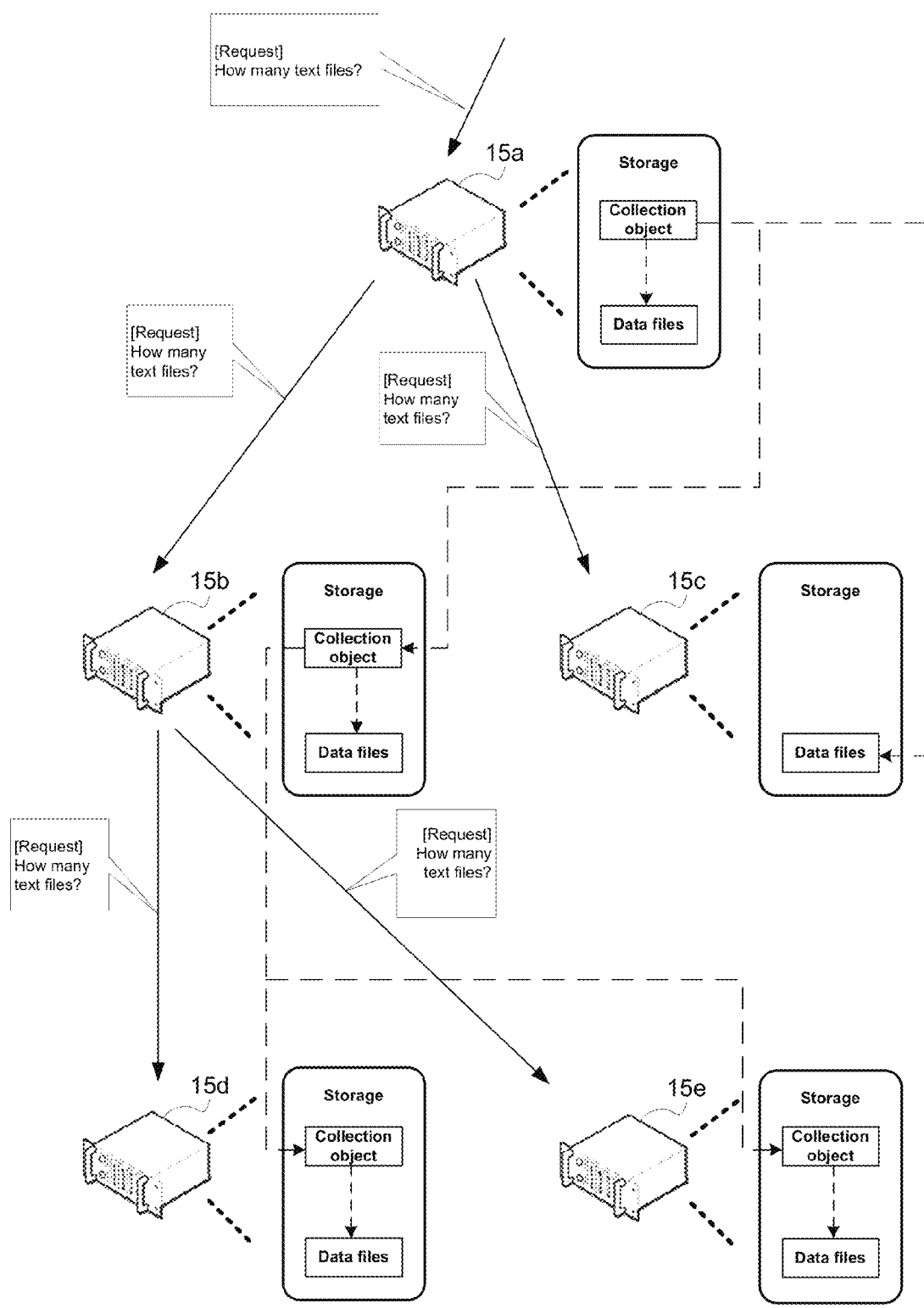
Figure 4B:
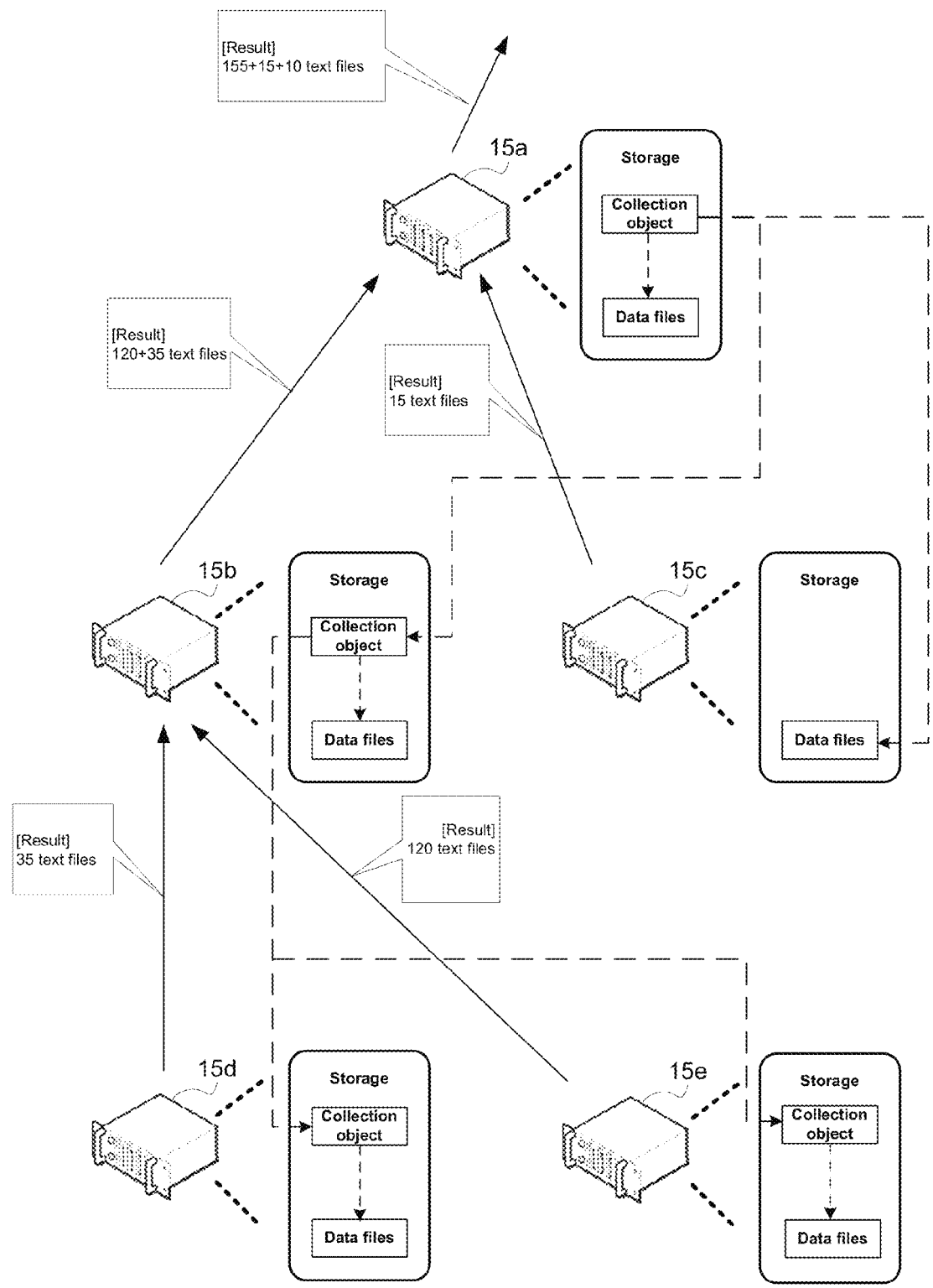

FIGS. 4a and 4b schematically illustrate an example information flow in the data storage system.

DETAILED DESCRIPTION

Detailed embodiments of aspects of the present inventive concept will now be described with reference to the drawings. The present disclosure is related to a distributed data storage system comprising a plurality of storage nodes. The structure of the system and the context in which it is used is outlined in FIG. 1.

A user computer 1 may access, for example via the Internet 3, an application 5 running on a server 7. The user context, as illustrated here, may therefore be a regular client-server configuration. However, it should be noted that the data storage system to be disclosed may be useful also in other configurations.

In the illustrated case, two applications 5, 9 run on the server 7. Of course however, this number of applications may be different. Each application may have an API (Application Programming Interface) 11 which provides an interface in relation to the distributed data storage system 13 and supports requests, typically write and read requests, from the applications running on the server 7. Data, such as the collection objects 19 and the data files 21 described below, may be read from and written to the storage system using the methods described in detail in U.S. patent application Ser. No. 13/125,524, filed Apr. 21, 2011, the contents of which are hereby incorporated by reference herein. Such methods of reading and writing of data will therefore not be further elaborated upon herein. From an application's point of view, reading or writing information from/to the data storage system 13 may appear to be done transparently, for instance in a manner similar to a file server or a hard drive. The server 7 may be considered to form part of the distributed storage system 13 or it may be considered to be a party external from the distributed storage system 13.

Each API 11 may communicate with storage nodes 15 in the data storage system 13, and the storage nodes may communicate with each other. Each storage node includes a network interface card (NIC) 18 having receiver and transmitter functionality wherein a storage node may receive and send data to/from other storage nodes and the server. These communications may be based on TCP (Transmission Control Protocol) and UDP (User Datagram Protocol). These concepts are well known to the skilled person, and are not explained further herein.

The present disclosure relates to methods which may be carried out in the server 7 and in the storage nodes 15. Those methods will primarily be embodied as software/hardware combinations, which for example may be implementations which are run on the server 7 and the storage nodes 15, respectively.

Although in FIG. 1 the server 7 is illustrated as a party which is separate from the storage nodes 15 it should be noted that the server 7 very well may be a storage node including server functionality.

The storage node 15 may typically be embodied by a file server which is provided with a number of functional blocks. The storage node may thus comprise a tangible storage medium 17, which typically comprises of a number of internal (e.g. connected via an IDE or a SATA interface) or external hard drives (e.g. connected via a USB or a Firewire interface), optionally configured as a RAID (Redundant Array of Independent Disk) system. Other types of storage media are however conceivable as well.

Each storage node 15 may include a processing entity 23 for controlling the storage node in accordance with the methods. The processing entity 23 may for example be a central processing unit configured to execute software instructions implementing the methods.

Each storage node 15 may contain a node list including the IP addresses of all or some storage nodes in its set or group of storage nodes. The number of storage nodes in a group may vary from a few to hundreds or thousands of storage nodes.

The tangible storage medium 17 may store one or more computer-readable collection objects 19 including a set of computer-readable references. The tangible storage medium may not be a radio signal. A collection object 19 may include a reference to data of the storage system 13, the data including at least one of a set of one or more collection objects 19 and a set of one or more data files 21, other than a collection object. A reference may include a pointer (e.g. a memory address) to a storage location at a storage node 15. A reference may include an identifier of the collection object or data file referred to.

A collection object 19 may be embodied as a directory in a file system of a storage node. Data files 21 referenced in the collection object 19 may be data files stored in the directory. Collection objects 19 referenced in the collection object may represent subdirectories stored in the directory.

A collection object 19 may also be embodied as a file having a predetermined format. The file may be a special file in the file system of the storage medium 17. Alternatively, the file may be a data file in the file system of the storage medium 17. Such a file may be readable using the same routines of the file system as the data files 21. For example the file may be a plain text file including references to collection objects 19 and/or data files 21.

FIG. 2 schematically illustrates a collection object 19a according to one embodiment. The collection object 19a may have an associated collection object identifier 20a. The identifier 20a may for instance be a Universally Unique Identifier (UUID). The collection object identifier 20a may be included in a header of the collection object 19a. However, the collection object identifier 20a need not be included in the collection object 19a but may be stored in a register of the storage node 15 storing the collection object 19a, the register associating the collection object 19a with the collection object identifier 20a.

The collection object 19a includes a field 22a with the identifier 20b of the collection object 19b. The collection object 19a may thus include a reference to the collection object 19b. The collection object 19b may be stored on the same storage node as the collection object 19a or on another storage node than the collection object 19a. The storage system may use the identifier 20b in the field 22a to locate and access the collection object 19b as will be described below.

Similarly to the collection object 19a, the collection object 19b includes a field 22b with the identifier 20c of the collection object 19c. The collection object 19c includes a field 22c with the identifier 20d of the data file 21a.

By appointing the collection object 19a as a root collection object, the collection object 19a may represent a root directory 19a of the storage system. Analogously the collection object 19b may represent a subdirectory 19b of the root directory 19a. The collection object 19c may represent a subdirectory of the subdirectory 19b. The data file 21a may represent a data file stored in the subdirectory 19c. The collection objects 19a-c may thus define a hierarchical storage structure. The structure may be referred to as a directory tree.

The collection objects 19 may be files, and the data may be stored in a flat storage structure, e.g. without any subdirectories or within a single directory, wherein a virtual hierarchical storage structure conveniently may be created by adding collection objects 19 including references to other collection objects 19 and/or data files 21. Each such set of collection objects may define a separate storage structure. Some of the data files may be referred to in more than one of the sets. It thus allows the same data to be organized in several different virtual hierarchical storage structures by using different sets of collection objects.

According to one example, multicast communication may be used to communicate simultaneously with a plurality of storage nodes 15. By a multicast or IP multicast is here meant a point-to-multipoint communication which is accomplished by sending a message to an IP address which is reserved for multicast applications. For example, a message may be sent to such an IP address (e.g. 244.0.0.1), and a number of recipient parties are registered as subscribers to that IP address. Each of the recipient parties may have its own IP address. When a switch in the network receives the message directed to 244.0.0.1, the switch may forward the message to the IP addresses of each party registered as a subscriber. In principle, only one party may be registered as a subscriber to a multicast address, in which case a point-to-point, communication is achieved. However, in the context of this disclosure, such a communication may nevertheless be considered a multicast communication since a multicast scheme is employed.

According to the present embodiment, unicast communication refers to a communication with a single recipient. A unicast communication initiated by a party of the network may be directed to a single specific recipient.

With reference to FIGS. 3 and 4a-b, a method for handling requests in the storage system 13 may comprise the storage node 15a receiving a request (box 31). The storage node 15a may receive the request from the server 7. The request may be generated using the API 11 following a request from the user computer 1. The request may alternatively be received from another storage node of the storage system 13. The request will in the following be referred to as the first request.

As illustrated by the dashed arrows the storage node 15a includes a collection object referring to data files stored on the storage node 15a and data files stored on the storage node 15c. The collection object may further include a reference to a collection object stored on the storage node 15b. For the purpose of the first request, the storage node 15a may be considered as a root storage node wherein the collection object may represent the root directory. According to the illustrated embodiment the first request may ask for the number of text files stored in the directory tree having a root defined by the collection object of the storage node 15a. It should be noted that the storage node 15a may store additional collection objects defining other hierarchical storage structures which need not be considered when processing the request. The first request may indicate (e.g. using by the identity of the collection object) which collection object the request pertains to.

The storage node 15a may generate a second request based on the first request (box 32). As illustrated in the example of FIGS. 4a-b the second request may be identical to the first request. In other words the second request may pertain to a same request as the first request, e.g., the request may ask for the number of text files stored in the directory tree defined by the collection object of the receiving storage node.

The storage node 15a may analyze the collection object and may determine that it includes a reference to another collection object. The storage node 15a may determine (box 33) the storage node 15b storing the referenced collection object. The determination may proceed as described below. The storage node 15a may send (box 34) the second request (or in other words an instance of the second request) to the determined storage node 15b. The second request may indicate (e.g. using by the identity of the collection object) which collection object the request pertains to.

The storage node 15a may also send the second request (or in other words an instance of the second request) to the storage node 15c wherein the storage node 15c may process the second request. Alternatively, the storage node 15a may, based on the references comprised in the collection object stored at the storage node 15a, determine the number of text files stored on the storage node 15c. The collection object stored at the storage node 15a may for example indicate the type of each data file referenced in the collection object.

The storage node 15a may process the first request (box 35) and may determine the number of text files stored at the storage node 15a (and optionally also the storage node 15c) by analyzing the collection object and the types of the referenced data files. In the following example, for purposes of illustration the storage node 15a may store 10 text files and that the storage node 15c may store 15 text files.

The storage node 15b may receive the second request. Analogously to the storage node 15a, the storage node 15b may analyze the collection object stored at the storage node 15b and may determine that it includes references to a collection object stored on the storage node 15d and a collection object stored on the storage node 15e. The storage node 15b may generate a third request based on the second request. As illustrated in the example of FIGS. 4a-b the third request may be identical to the second request. In other words the third request may pertain to a same request as the second request, e.g. the request may ask for the number of text files stored in the directory tree defined by the collection object of the receiving storage node. The storage node 15b may send (an instance of) the third request to each of the storage node 15*d* and 15*e*. The third request may indicate (e.g. by using the identity of the collection object) which collection object the request pertains to. The instance of the third request sent to the storage node 15*d* may indicate that it pertains to the collection object of the storage node 15*d*. The instance of the third request sent to the storage node 15*e* may indicate that it pertains to the collection object of the storage node 15*e*.

The storage node 15*b* may process the second request and may determine the number of text files stored at the storage node 15*b*, for example by analyzing the collection object stored at the storage node 15*b* and the types of the referenced data files. For purposes of illustration, it may be assumed that the collection object at the storage node 15*b* does not refer to any text files.

At the storage nodes 15*d* and 15*e* the method may proceed in a manner similar to the operations at the storage node 15*b*. However, in an example the collection object stored at the storage node 15*d* and the collection object stored at the storage node 15*e* may not include a reference to a collection object. Hence, the storage nodes 15*d* and 15*e* may not generate and send any requests to any further storage nodes. The collection objects of the storage nodes 15*d* and 15*e* may thus correspond to subdirectories not including any further subdirectories. The storage nodes representing the lowest levels of the hierarchical storage structure may have thus been reached. In another example storage nodes 15*d* and 15*e* may continue the recursive signaling, for example if they include a reference to a collection object including further subdirectories.

The storage node 15*d* may process the third request and may determine the number of text files stored at the storage node 15*b*, for example by analyzing the collection object stored at the storage node 15*d* and the types of the referenced data files. A similar processing may be performed at the storage node 15*e*. For purposes of illustration, it may be assumed that the collection objects of the storage node 15*d* and 15*e* refers to 35 text files and 120 text files, respectively.

With reference to FIG. 4*b*, in response to determining the result of the processing of the third request, the storage node 15*e* may send the result to the storage node 15*b* which may be the originator of the third request. Analogously the storage node 15*d* may send its result to the storage node 15*b*.

In response to receiving the result from the storage node 15*d* and the storage node 15*e*, the storage node 15*b* may determine a result by adding the received results to the number of text files stored at the storage node 15*b* as determined above. The storage node 15*b* may sends the determined result to the storage node 15*a* which may be the originator of the second request.

In response to receiving the result from the storage node 15*b* (box 36) the storage node 15*a* may determine a result by adding the received result to the number of text files stored at the storage node 15*a* (and optionally the storage node 15*c*) as determined above. The storage node 15*a* may then send the determined result to the originator of the first request (box 37). The result determined at the storage node 15*a* may be the number of text files stored in the hierarchical storage structure formed by the collection objects of the storage nodes 15*a-e*.

In the above, the result determined at each storage node 15 may be sent to the originator of a request received at a respective storage node 15. According to another example, the result may be sent directly from a storage node 15*b-e* to the storage node 15*a* receiving the first request. This may result in a quicker communication of the results. Each storage node 15*b-e* may for example include an indication of which storage node is the root storage node (e.g. the storage node 15*a*). The indication may include the IP-address of the root storage node. According to a further example embodiment the result may be sent directly to the originator of the first request, e.g. the server 7. Each storage node 15 may for example include an indication of which network entity is the server 7. The indication may include the IP-address of the server 7.

In the following, methods of a storage node 15 for determining a recipient of a request will be described. The methods may be described with reference to storage node 15*a* but they are equally applicable to the further storage nodes 15 of the storage system.

In response to determining that the collection object of the storage node 15*a* includes a reference to another collection object the storage node 15*a* may transmit a multicast message to the other storage nodes 15*b-e*, for example requesting a storage node storing the referenced collection object to respond. The multicast message may for example include the identifier of the desired collection object. Each storage node 15, in response to receiving the multicast message, may scan its storage medium 17 after a collection object having said identifier. If found the storage node (in FIG. 4*a* the storage node 15*b*) may indicate to the storage node 15*a* that it stores the referenced collection object. The indication may be sent using unicast communication. The storage node 15*a* may then send the second request to the storage node 15*b*. The second request may be sent using unicast communication.

According to an alternative method the storage node 15*a* may store an indication of a storage node storing the referenced collection object. For example the collection object of the storage node 15*a* may in addition to the identifier store the IP-address of the storage node 15*b* storing the referenced collection object. The storage node 15*a* may thus send the second request to the storage node 15*b* in accordance with the indication without any preceding multicast message. The second request may be sent using unicast communication.

For data security reasons, some or all data stored in the storage system 13 (i.e. the collection objects 19 and the data files 21) may be stored redundantly in the storage system. Copies or instances of each collection object 19 and data file 21 may be stored at two or more storage nodes 15. Each instance of a collection object 19 or data file 21 may be associated with the same identifier. In such a case, a redundantly stored collection object may be retrieved from either one of or all of the storage nodes storing the collection object.

For purposes of illustration, it may be assumed that the collection object referenced in the collection object of the storage node 15*a* may be stored at both the storage node 15*b* and 15*c*. The storage node 15*a* may then determine the recipient for the second request as follows. The storage node 15*a* may send a multicast message to the other storage nodes 15*b-e* requesting a storage node storing the referenced collection object to respond. The multicast message may for example include the identifier of the desired collection object. Each storage node 15*b-e*, in response to receiving the multicast message, may scan its storage medium 17 after a collection object having said identifier. Each storage node storing a collection object associated with said identifier (e.g., storage nodes 15*b* and 15*c*) may indicate to the storage node 15*a* that it stores the indicated collection object. The indication may be sent using unicast communication. The storage node 15*a* may then send the second request to one of the storage nodes 15b and 15c. The second request may be sent using unicast communication. The storage node 15a may have access to load information for the storage nodes 15b and 15c or information regarding a geographical location of the storage nodes 15b and 15c. The storage node 15a may then select the recipient based on the load information and/or location information. For example the storage node having the lowest load or the storage node being closest to the storage node 15a may be selected as the recipient for the second request. The information may for example be included in the indication from the storage nodes 15b and 15c.

According to another example method the storage node 15a may store an indication of the storage nodes storing the referenced collection object. For example the collection object of the storage node 15a may in addition to the identifier store the IP-address of the storage nodes 15b and 15c storing the referenced collection object. The storage node 15a may select one of the storage nodes 15b and 15c as recipient for the second request and may send the second request in accordance with the indication. As described above the storage node 15a may have access to load information or geographical location information to use as a basis for the selection. The geographical location information may for example be stored at the storage node 15a. The load information may for example be previously received from the storage nodes 15b and 15c. Alternatively the server 7 may regularly monitor the loads of the storage nodes 15a-e and distribute the load information to the storage nodes 15a-e.

A request received at a storage node 15 may, as in the illustrated embodiment, ask for the number of text files stored in the storage system 13. It should be noted however that this request is exemplary and constitutes an example and that many other types of requests are contemplated. By way of example the request may ask a storage node to provide one or more of a number or files or a list of files of a certain type; a number or a list of collection objects; a number or a list of files and/or collection objects including a certain phrase; a number or a list of files including a certain data set; and/or a number or a list of files including a certain file attribute (e.g. read-only, read-write, permissions, hidden, time stamps). Alternatively or additionally the request may ask a storage node to perform an operation on the stored data such as change a file attribute (e.g. read-only, read-write, permissions, hidden, time stamps); change a file name; alter a file header; and/or to add or delete a file or collection object to/from each directory and subdirectory etc. The request may ask a storage node to perform such an operation on all stored data or to a subset of the stored data (e.g. data of a certain type, data files having a certain file attribute, files having a certain time stamp etc.).

The result determined at a storage node may, as in the illustrated embodiment, include a sum of the results received at the storage node. More generally, the result determined at a storage node may include an aggregate of the results received at the storage node. With reference to FIG. 4b the result determined by a storage node may for example indicate for each collection object, the number of text files contained therein. In case the information asked for is a list, the result provided by a storage node may be a concatenation of the lists received as results at the storage node and the list(s) resulting from the analysis at the storage node. In case the query asks the storage node to perform an operation on the stored data, the result provided by a storage node may be a number of modified or created files, a value indicating success (e.g. 0) or failure (e.g. 1), or a simply a default value.

In the embodiment of FIGS. 3, 4a and 4b the first, second and third requests were identical in that they pertain to a same request. A request sent by a storage node may be different than a request received by the storage node. For example the first request may include an indication of the number of levels of the directory tree that is to be visited. The storage node 15a may then generate a second request wherein the number of further levels that is to be visited is reduced by one. Similarly the storage node 15b may generate a third request wherein the number of further levels that is to be visited is reduced by one. A storage node receiving a request indicating that no further levels are to be visited may then not generate a further request but simply process the received request and send the result in accordance with any of the alternatives described above. The depth of the recursion may thus be controlled.

In the above the invention has mainly been described with reference to a limited number of examples. However, as is readily appreciated by a person skilled in the art, other examples than the ones disclosed above are equally possible within the scope of the invention, as defined by the appended claims.

What is claimed:

1. A method for handling requests in a storage system, the storage system including a plurality of storage nodes connected to each other via a communications network, the method comprising:
a first storage node of the plurality of storage nodes receiving a first request, wherein data stored within the data storage system is organized using a distributed directory structure, a plurality of collection objects distributed among the plurality of storage nodes correspond to directories or subdirectories in the distributed directory structure, the first storage node stores a first collection object corresponding to a directory in the distributed directory structure, the first collection object comprises a reference to a second collection object stored on at least a second storage node in the storage system, the second collection object corresponding to a first subdirectory of the directory represented by the first collection object, the reference to the second collection object comprises a unique identifier for the second collection object, and the first request implicates a plurality of directory tree levels of the distributed directory structure;
the first storage node determining that a second request is to be sent based on the first request implicating data associated with the first subdirectory and based on the first subdirectory being included in the plurality of directory tree levels implicated by the first request, the first subdirectory being represented by the second collection object;
the first storage node determining to which storage nodes the second request should be sent by:
the first storage node sending a first multicast message that includes the unique identifier for the second collection object included in the reference to the second collection object,
the first storage node receiving a response to the first multicast message from at least the second data storage node, and
the first storage node determining to send the second request to at least the second storage node based on the second storage node responding to the first multicast message;
the first storage node sending the second request to at least the second storage node storing the second collection object referenced by the first collection object using a unicast message, wherein the second request indicates a number of directory tree levels that are implicated by the second request, the number of directory tree levels that are implicated by the second request is one level less than the plurality of directory tree levels implicated by the first request, and the second collection object comprises a reference to a third collection object stored on at least a third storage node and a reference to a data file stored in the data storage system;

the first storage node receiving a second response to the second request from the second storage node, the second response comprising at least information obtained from the third storage node storing the third collect object referenced by the second collection object; and the first storage node sending a first response to the first request, the first response comprising at least the information obtained from the third storage node that is included in the second response.

2. The method according to claim 1, further comprising:
the first storage node receiving at least a second response to the first multicast message, the second response being received from a fourth storage node; and
the first storage node determining to send the second request to the second storage node rather than the fourth storage node based on one or more of load information or location information for the second and fourth storage nodes.

3. The method according to claim 1, wherein the first storage node concatenates the information obtained from the third storage node with information associated with data associated with the directory represented by the first collection object for inclusion in the first response.

4. The method according to claim 3, wherein the second response further comprises information associated with the first subdirectory represented by the second collection object, and the information associated with the first subdirectory is also included in the first response.

5. The method according to claim 1, wherein the first request is received from and the first response is sent to a server accessing the data storage system.

6. The method according to claim 1, further comprising:
the second storage node sending a third request to the third storage node based on the second request implicating data associated with a second subdirectory represented by the third collection object and based on the third storage node storing the third collection object.

7. The method according to claim 1, further comprising:
the first storage node processing the first request;
the first storage node determining a first result based on the processing; and
the first storage node sending the first result to an originator of the first request.

8. The method according to claim 7, further comprising, at each storage node receiving the second request:
processing the second request;
determining a second result based on the processing; and
sending the second result.

9. The method according to claim 8, wherein the second result is sent to the first storage node.

10. The method according to claim 9, wherein the first storage node determines the first result in response to receiving the second result from a recipient of the second request, and determines the first result based on the processing of the first request and the second result.

11. The method according to claim 8, wherein the second result is sent to an originator of the first request.

12. The method according to claim 1, wherein the first request indicates a request for information regarding data stored in the storage system or indicates a request for an operation to be performed on data stored in the storage system.

13. The method according to claim 1, wherein the first request is received from and the first response is sent to another storage node in the storage system.

14. The method according to claim 1, wherein the first request comprises a request for the data file referenced by the third collection object and the information obtained from the third storage node comprises the data file.

15. A data storage system comprising a plurality of storage nodes, wherein:
a first storage node of the plurality of storage nodes is configured to:
store a first collection object corresponding to a directory in a distributed directory structure, the first collection object comprising a reference to a second collection object stored at least at a second storage node, wherein data stored within the data storage system is organized using the distributed directory structure, a plurality of collection objects distributed among the plurality of storage nodes correspond to directories or subdirectories in the distributed directory structure, the second collection object corresponds to a first subdirectory of the directory represented by the first collection object, and the reference to the second collection object comprises a unique identifier for the second collection object;
receive a first request from a server accessing the data storage system, wherein the first request implicates a plurality of directory tree levels of the distributed directory structure,
determine that a second request is to be sent based on the first request implicating data associated with the first subdirectory included in the plurality of directory tree levels, the first subdirectory being represented by the second collection object;
determine to which storage nodes the second request should be sent by being configured to:
send a first multicast message that includes the unique identifier for the second collection object included in the reference to the second collection object,
receive a response to the first multicast message from at least the second data storage node, and
determine to send the second request to at least the second storage node based on the second storage node responding to the first multicast message;
send the second request to at least the second storage node storing the second collection object using a unicast message in response to receiving the first request, wherein the second request indicates a number of directory tree levels that are implicated by the second request, and the number of directory tree levels that are implicated by the second request is one level less than the plurality of directory tree levels implicated by the first request;
the second storage node of the plurality of storage nodes is configured to:
store the second collection object, wherein the second collection object comprises a reference to a third collection object stored on at least a third storage node of the plurality of storage nodes and a reference to a data file stored in the data storage system, receive the second request from first storage node, and send a third request to the third storage node in response to receiving the second request, wherein the third request is sent to the third storage node based on the third collection object corresponding to one of the number of directory tree levels implicated by the second request;

the third storage node is configured to receive and process the third request, and send a third response to the second storage node in response to the third request;

the second storage node is configured to receive and process the third response, and send a second response to the first storage node, the second response being formed based on the third response; and the first storage node is configured to receive and process the second response, and send a first response to the server, the first response being formed based on the second response.

16. The data storage system of claim 15, wherein:
the first storage node is further configured to receive at least a second response to the first multicast message from a fourth storage node, and determine to send the second request to the second storage node rather than the fourth storage node based on one or more of load information or location information for the second and fourth storage nodes.

17. A data storage node of a data storage system, the data storage node comprising a processor configured to:

receive a first request, wherein data stored within the data storage system is organized using a distributed directory structure, a plurality of collection objects distributed among a plurality of storage nodes correspond to directories or subdirectories in the distributed directory structure, the storage node is configured to store a first collection object corresponding to a directory in the distributed directory structure, the first collection object comprises a reference to a second collection object stored on at least a second storage node in the storage system, the second collection object corresponding to a first subdirectory of the directory represented by the first collection object, the reference to the second collection object comprises a unique identifier for the second collection object, and the first request implicates a plurality of directory tree levels of the distributed directory structure;

determine that a second request is to be sent based on the first request implicating data associated with the first subdirectory and based on the first subdirectory being included in the plurality of directory tree levels implicated by the first request, the first subdirectory being represented by the second collection object, wherein the second collection object comprises a reference to a third collection object stored on at least a third storage node and a reference to a data file stored in the data storage system;

determine to which storage nodes the second request should be sent by being configured to:

send a first multicast message that includes the unique identifier for the second collection object included in the reference to the second collection object, receive a response to the first multicast message from at least the second data storage node, and determine to send the second request to at least the second storage node based on the second storage node responding to the first multicast message;

send the second request to at least the second storage node storing the second collection object referenced by the first collection object using a unicast message, wherein the second request indicates a number of directory tree levels that are implicated by the second request, the number of directory tree levels that are implicated by the second request is one level less than the plurality of directory tree levels implicated by the first request, and the second collection object comprises a reference to a third collection object stored on at least a third storage node and a reference to a data file stored in the data storage system;

receive a second response to the second request from the second storage node, the second response comprising at least information obtained from the third storage node storing the third collection object referenced by the second collection object; and send a first response to the first request, the first response comprising at least the information obtained from the third storage node that is included in the second response.

18. The storage node according to claim 17, wherein the first request is received from and the first response is sent to a server accessing the data storage system.

19. The storage node according to claim 18, wherein the first collection object stored at the storage node corresponds to a root directory of distributed directory structure.

* * * * *